(12) United States Patent
Steffens et al.

(10) Patent No.: US 10,421,115 B2
(45) Date of Patent: Sep. 24, 2019

(54) HARD-ROLLING ROLLER HEAD FOR THE DEEP ROLLING OF THE CRANKPINS OF A SPLIT-PIN CRANKSHAFT

(71) Applicant: HEGENSCHEIDT-MFD GmbH, Erkelenz (DE)

(72) Inventors: Hans Toni Steffens, Erkelenz (DE); Hans Zimmermann, Selfkant (DE)

(73) Assignee: HEGENSCHEIDT-MFD GmbH, Erkelenz (DE)

( * ) Notice: Subject to any disclaimer, the term of this patent is extended or adjusted under 35 U.S.C. 154(b) by 76 days.

(21) Appl. No.: 15/446,166

(22) Filed: Mar. 1, 2017

(65) Prior Publication Data
US 2017/0252796 A1 Sep. 7, 2017

(30) Foreign Application Priority Data
Mar. 2, 2016 (DE) .................... 20 2016 001 445 U

(51) Int. Cl.
*B21H 7/18* (2006.01)
*B24B 39/04* (2006.01)
*B23P 9/02* (2006.01)

(52) U.S. Cl.
CPC ............. *B21H 7/185* (2013.01); *B24B 39/04* (2013.01); *B23P 9/02* (2013.01); *B23P 2700/07* (2013.01)

(58) Field of Classification Search
CPC ........ B21D 11/16; B21D 13/08; B21D 13/10; B21D 17/04; B24B 39/04; B23P 9/02; B23P 2700/07; B21H 7/185
USPC ............................................ 29/6.01
See application file for complete search history.

(56) References Cited

U.S. PATENT DOCUMENTS

| 7,493,788 B2 * | 2/2009 | Heffe ...................... B21H 7/185 72/110 |
| 2005/0126252 A1 * | 6/2005 | Feldmann ................ B21D 3/00 72/393 |

* cited by examiner

*Primary Examiner* — Pradeep C Battula
(74) *Attorney, Agent, or Firm* — Harness, Dickey & Pierce, P.L.C.

(57) ABSTRACT

The invention discloses a hard-rolling roller head with two separate housings for deep rolling the outside radii of adjoining crankpins of a split-pin crankshaft. The hard-rolling roller head provides an effective support of the two housings against one another, when machining split-pin crankshafts, and simultaneously prevents the upper areas of these housings from drifting apart.

12 Claims, 3 Drawing Sheets

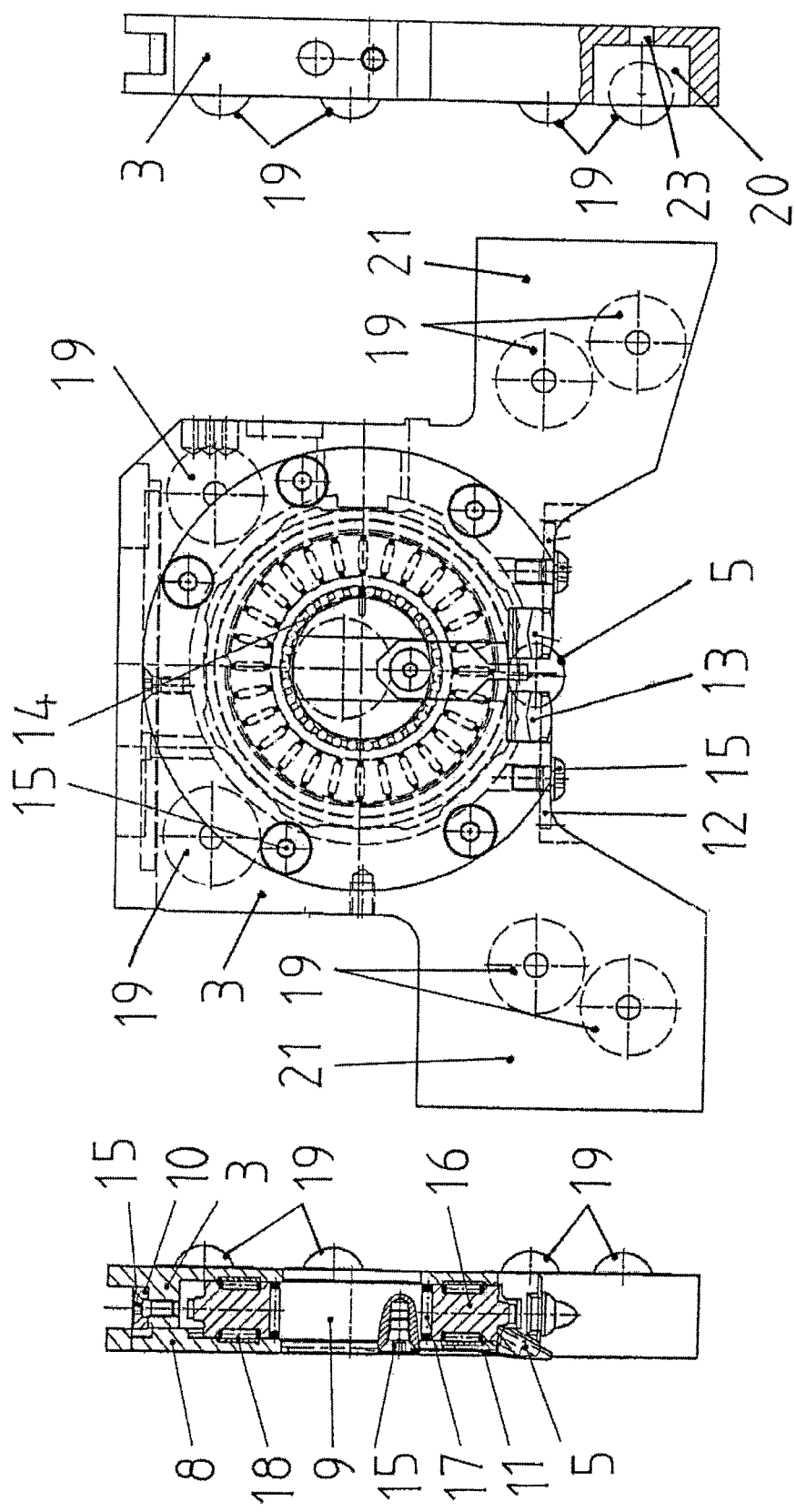

HARD-ROLLING ROLLER HEAD FOR THE DEEP ROLLING OF THE CRANKPINS OF A SPLIT-PIN CRANKSHAFT

CROSS-REFERENCE TO RELATED APPLICATIONS

This application claims the benefit of and priority to German Patent Application No. 20 2016 001 445.6, filed Mar. 2, 2016. The disclosure of the above application is incorporated herein by reference.

FIELD

The invention concerns a hard-rolling roller head with two separate housings for deep rolling the outside radii or recesses of the adjoining crankpins of a split-pin crankshaft.

BACKGROUND

In the case of V-shaped combustion engines, the cylinders are arranged in two rows inclined toward one another. The pistons guided in the cylinders are respectively connected to a common crankshaft via a respective connecting rod; this crankshaft features several crankpins for the swivel mounting of the connecting rods. Here, the cylinders of the two rows are frequently offset toward one another in an axial direction such that the connecting rods of two approximately opposite cylinders are supported on two directly adjoining crankpins. Inasmuch as these crankpins feature longitudinal centre axes offset toward one another, a two-part crankpin ("split pin") is formed, which is why corresponding crankshafts are designated as split-pin crankshafts.

Known deep rolling tools for deep-rolling the outside radii or recesses of split-pin crankshafts usually feature two separate housings in which work rollers are pivoted, that a rolling force is applied to and that are pressed into the radii or recesses of a split-pin crankshaft. During machining the split-pin crankshaft rotates around its axis of rotation and the two housings follow—independently of one another—the respective lifting motions of the split-pin crankpins. Between the facing internal sides of the two housings there is located an additional assembly, functionally acting as a support device, which supports the two housings against one another. Such support is necessary as due to the rolling force being applied reaction forces are also generated that are transmitted from the work rollers to the housings and must be taken up.

From U.S. Pat. No. 5,575,167 A, a relevant support device is known, which consists of ring-shaped and flat bearing plates made of Teflon, nylon or other unspecified synthetic materials which primarily should feature good sliding characteristics and low wear.

In accordance with EP 0 661 137 B1 such a support device consists of a ring-shaped thrust bearing assembly located between the housings. This assembly effects an alignment of the two housings in parallel vertical planes, whilst these are rotated in relation to one another around the axis of a split-pin crankshaft or whilst a split-pin crankshaft rotates underneath the housings. For functionality it is essential that the thrust bearing assembly takes up and cancels out the resulting lateral pressure forces directed against one another, that are generated by the opposing work rollers inclined outwards during the rolling process. However, here problems may occur as the work rollers in axial direction of the crankshaft are fixed in end position by the crank webs limiting the radii or recesses. Thus, reaction forces can occur in the area of the housings located opposite to the crankshaft, which may cause a slight drifting apart of these areas and thereby have a detrimental effect on machining quality.

DE 103 57 441 B3 concerns a support for a hard-rolling roller head with two separate housings where the inner sides of the housings respectively feature an extension section which extends in rolling force direction to a point underneath the contact point between the work rollers and the radii or recesses to be deep-rolled. Here, the support device is embodied as a large surface support plate made of materials containing nylon, Teflon or carbon. The support plate is firmly connected to the inside and the extension sections of one of the two housings. This design has proven itself for providing and ensuring an effective support of the housings against one another and at the same time preventing the upper areas of the housings from drifting apart. However, a disadvantage here is that the two deep rolling head housings involved are in large surface contact with one another. As the housings—during a machining of split-pin crankshafts—carry out unusual movements that can be described exactly in part only (frequently these are similar to an ellipsis contour), they slide at the contact surfaces. Due to the work roller arrangement at an incline against one another, inside the two housings, they are pressed against one another by means of relatively high forces acting in axial crankshaft direction.

SUMMARY

A hard-rolling roller head for deep rolling the outside radii or recesses of adjoining crankpins of a split-pin crankshaft is disclosed. The roller head includes two separate housings, with respectively one work roller being pivoted in the housings. A rolling force is applied and the work rollers are pressed into the radii or recesses of the crankpin, with the split-pin crankshaft turning around its axis of rotation during machining. The two housings, independently of one another, follow the lifting motions of the respectively assigned crankpins, with the housings—in relation to the axis of rotation of the split-pin crankshaft on both sides and at radial distance to the same—featuring one extension section each, and with an assembly, functionally acting as a support device, being located between the facing internal sides of the two housings, that supports the two housings against one another.

It is the task of the invention to design the support device, on a hard-rolling roller head with two separate housings, such that there is only a minor surface contact occurring between the two housings, without the functionally relevant take-up of the reaction forces transmitted from the work rollers to the housings being detrimentally affected, however.

The task is solved by several components with cylindrically shaped and/or ball-shaped contours on the inside of one housing being supported such that they rotate freely and roll on the inside of the other housing. Advantageous embodiments are dealt with in subordinate claims, the characteristics of which are described in more detail in the design example.

The embodiment of a hard-rolling roller head in accordance with the invention provides for an effective support of the two housings against one another, when machining split-pin crankshafts, and simultaneously prevents the upper areas of these housings drifting apart. Here, it is particularly advantageous that, in spite of the small contact surface areas between the two housings, a good take-up of the reaction forces transmitted from the work rollers to the housings is achieved.

In the following, a design example of the invention is explained in greater detail with reference to the drawing. The following items are shown:

BRIEF DESCRIPTION OF DRAWINGS

FIG. 1 shows a first housing of a hard-rolling roller head designed in accordance with the invention.

FIG. 1a shows a plan view with a view onto the side area functionally situated outside.

FIG. 1b shows a first side view with partially cross-sectioned base body.

FIG. 1c shows a second side view with partially cross-sectioned base body.

FIG. 2 shows a second housing of a hard-rolling roller head designed in accordance with the invention.

DETAILED DESCRIPTION

Figures 2A, 2B, 2C:
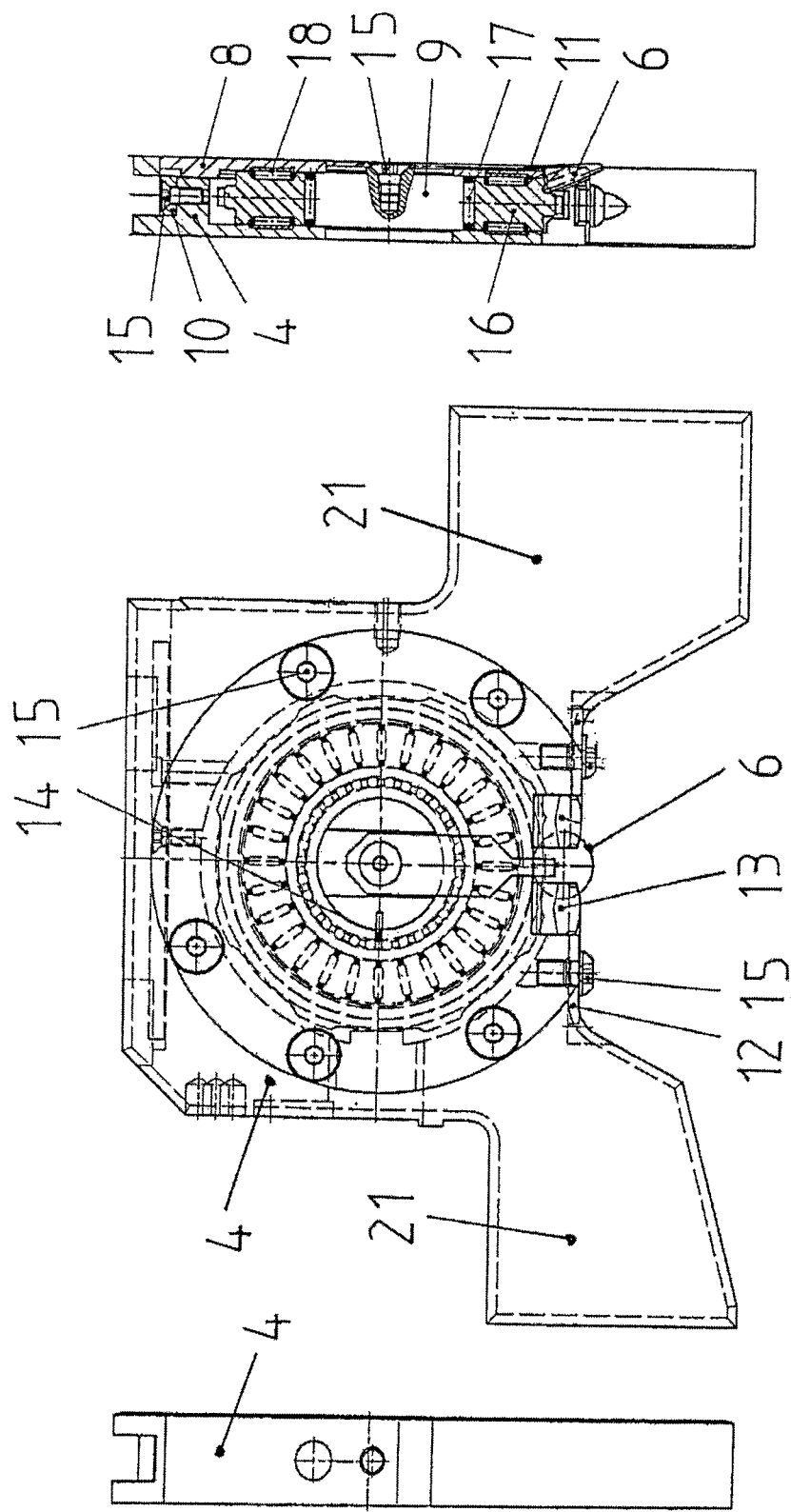
FIG. 2a shows a plan view with a view onto the side area functionally situated outside.
FIG. 2b shows a first side view.
FIG. 2c shows a second side view with partially cross-sectioned base body.

The hard-rolling roller head 1, shown in the drawing, for deep rolling external recesses or radii on the crankpins of a split-pin crankshaft 2 features two deep rolling head housings 3 and 4, the inside surfaces of which are facing one another. The deep rolling of the recesses or radii is effected with work rollers 5 and 6 to which a rolling force is applied by deep rolling unit 7 via the housings 3 and 4 of the hard-rolling roller head 1. Whilst deep rolling takes place, the split-pin crankshaft 2 turns around its axis of rotation, which runs vertically to the presentation plane of FIG. 1a, FIG. 2a and FIG. 3.

FIG. 1 and FIG. 2 show the basic setup of the two deep rolling head housings 3 and 4. Accordingly, the housings 3 and 4 respectively comprise bearing covers 8, bearing bolts 9, plates 10, leaf springs 11, cage plates 12, cages 13, parallel pins 14 and various different screws 15. The work rollers 5 and 6 are respectively supported by a guide roller 16 which is supported in the deep rolling head housing 3 or 4 on radial bearings 17 and axial bearings 18 such that it is freely rotatable.

On the inside of the deep rolling head housing 3, several components 19 with a cylindrically shaped and/or ball-shaped contour are supported such that they are freely rotatable. These components 19 can roll on the inside of the other deep rolling head housing 4.

Here, on the inside of the deep rolling head housing 3, several recesses 20 are embodied in which respectively a cylindrically shaped and ball-shaped component 19 is located. Thus, these components 19 are fixed in position very exactly so that they provide for a functionally safe support in all relative positions of the housings 3 and 4 towards one another.

The recesses 20 preferably feature such a construction depth that the components 19 supported therein such that they are freely rotatable protrude from the respective recess 20 with maximally 25% of their cross-sectional surface (FIG. 1c). In addition, an opening 23 is embodied respectively at the recesses 20, which is orientated toward the outside of the deep rolling head housing 3 and by means of which, for example, lubricants for the cylindrically shaped or ball-shaped components 19 can be fed in For an effective support of the two deep rolling head housings 3 and 4 against one another, the cylindrically shaped or ball-shaped components 19 are respectively located in the corner areas of the deep rolling head housing 3. This results in a particularly effective support, inasmuch (as shown in the drawing) as respectively two components 19 are located at the end section orientated toward the deep rolling unit 7, and respectively two components 19 at each of the two extension sections 21 of the deep rolling head housing 3.

Figure 3:
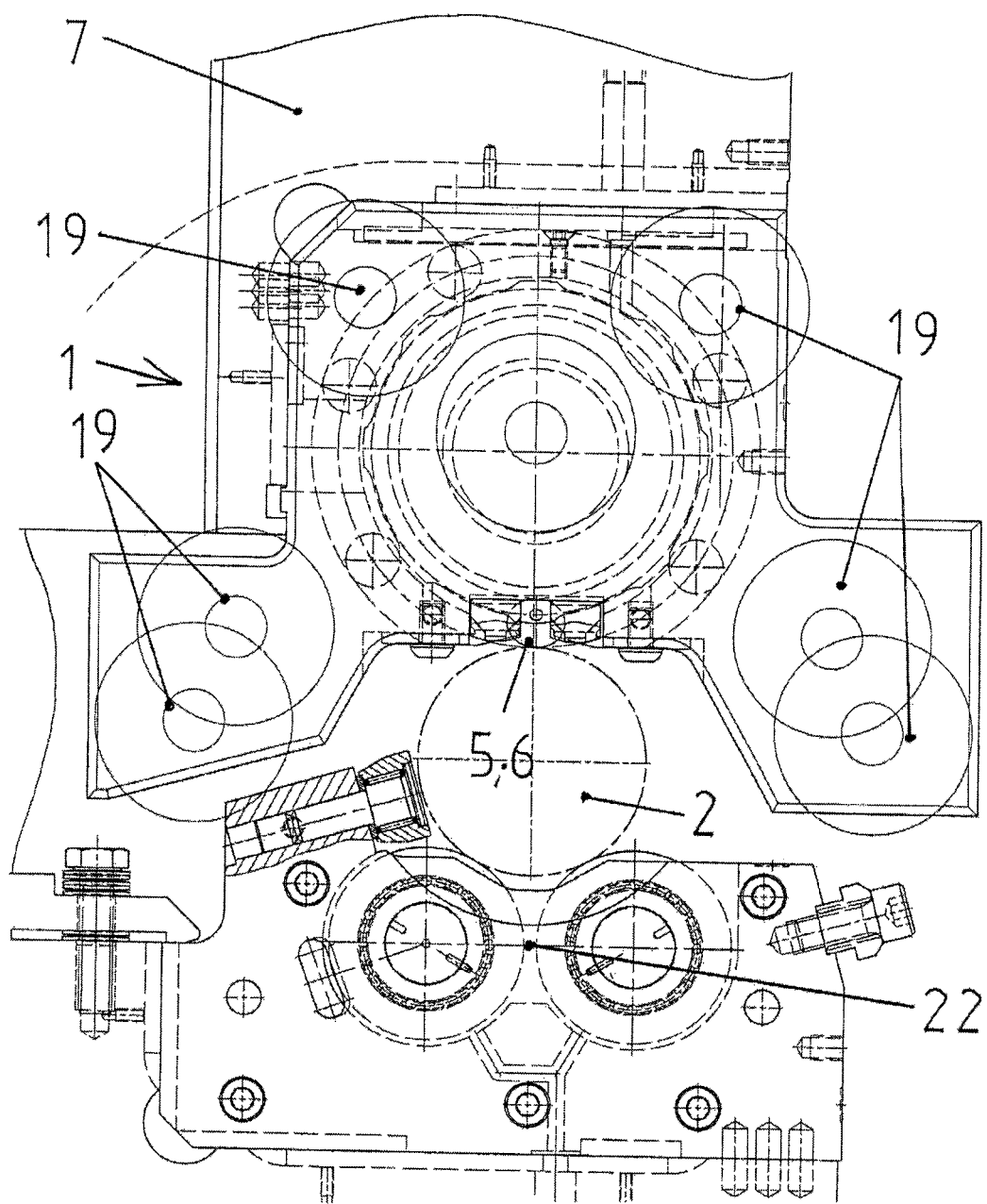
FIG. 3 shows a cutout from a deep rolling unit equipped with a hard-rolling roller head in accordance with the invention.

FIG. 3 shows a cutout from a deep rolling unit 7, illustrating the active connection of the hard-rolling roller head 1 with work rollers 5 or 6, the split-pin crankshaft 2 to be machined and a support roller head 22 as well as the location of the cylindrically shaped or ball-shaped components 19 located between deep rolling head housings 3 and 4.

The invention claimed is:

1. A hard-rolling roller head for use in deep rolling radii or recesses of adjoining first and second crankpins of a split-pin crankshaft of the type having the first crankpin and the second crankpin offset from one another in a direction perpendicular to a longitudinal axis of rotation of the crankshaft, the hard-rolling roller head comprising:

a first housing comprising a first inside surface and at least one first extension section, the first housing rotatably supporting a first work roller for deep rolling a first radii or recess of the first crankpin of the split-pin crankshaft;

a second housing comprising a second inside surface and at least one second extension section, the second housing rotatably supporting a second work roller for deep rolling a second radii or recess of the second crankpin of the split-pin crankshaft;

wherein the first housing further comprises a plurality of bearing components rotatably supported in the first housing, each of the plurality of bearing components protruding from the first inside surface;

wherein the first housing and the second housing are supported in the hard-rolling roller head adjacent one another so that the plurality of bearing components simultaneously engage the second inside surface and enable the first housing and the second housing to move independently relative to one another in a direction of a longitudinal axis bisecting the first housing.

2. The hard-rolling roller head in accordance with claim 1, wherein each of the plurality of bearing components comprises one of a cylinder and a sphere.

3. The hard-rolling roller head in accordance with claim 2, wherein the first inside surface of the first housing comprises a plurality of recesses;

wherein one of the plurality of bearing components is disposed in each of the plurality of recesses such that up to 25% of a cross-sectional surface area of the bearing component protrudes from the recess.

4. The hard-rolling roller head in accordance with claim 3, wherein each of the plurality of the recesses comprises an opening to an outside surface of the first housing.

5. The hard-rolling roller head in accordance with claim 1, wherein at least one of the plurality of bearing components is located at each of a plurality of corner areas of the first housing.

6. The hard-rolling roller head in accordance with claim 5, wherein at least one of the plurality of bearing components is located at the at least one first extension section.

7. The hard-rolling roller head in accordance with claim 5, wherein more than one of the plurality of bearing components is located at the first extension section.

8. The hard-rolling roller head in accordance with claim 1, wherein the first housing comprises two first extension sections at a first end of the first housing; and a first upper section at a second end of the first housing opposite the first end of the first housing; and
    wherein at least one of the plurality of bearing components is located at each of the two first extension sections of the first housing and at the first upper section of the first housing.

9. The hard-rolling roller head in accordance with claim 8, wherein at least two of the plurality of bearing components is located at each of the two first extension sections of the first housing.

10. The hard-rolling roller head in accordance with claim 8, wherein the second housing comprises two second extension sections at a first end of the second housing; and a second upper section at a second end of the second housing opposite the first end of the second housing.

11. The hard-rolling roller head in accordance with claim 1, wherein each of the plurality of bearing components comprises a spherical bearing.

12. The hard-rolling roller head in accordance with claim 1, wherein each of the plurality of bearing components comprises a cylindrical bearing.

\* \* \* \* \*